United States Patent [19]

Tejeda

[11] 3,869,364
[45] Mar. 4, 1975

[54] SYSTEM FOR INHIBITING ATTACK ON A FERROUS ANODE ELECTRODE IN AN ELECTRODIALYTIC CELL

[75] Inventor: Alvaro R. Tejeda, New York, N.Y.

[73] Assignee: J. Vast Associates Inc., New York, N.Y.

[22] Filed: Jan. 5, 1973

[21] Appl. No.: 321,333

[52] U.S. Cl. .............................. 204/301, 204/180 P
[51] Int. Cl. .............................................. B01k 5/00
[58] Field of Search ........................ 204/180 P, 301

[56] References Cited
UNITED STATES PATENTS

| | | | |
|---|---|---|---|
| 3,084,113 | 4/1963 | Vallino | 204/180 P X |
| 3,398,078 | 8/1968 | Gregor | 204/180 P |
| 3,437,580 | 4/1969 | Arrance et al. | 204/180 P X |
| 3,496,081 | 2/1970 | Scheder | 204/180 P |
| 3,544,436 | 12/1970 | Francis et al. | 204/180 P |
| 3,595,768 | 7/1971 | Scheder | 204/180 P |
| 3,654,104 | 4/1972 | Yoshida et al. | 204/180 P X |
| 3,686,089 | 8/1972 | Korngold et al. | 204/180 P |

Primary Examiner—John H. Mack
Attorney, Agent, or Firm—Kirchstein, Kirchstein, Ottinger & Frank

[57] ABSTRACT

An electrodialytic cell in which electrochemical corrosion of a ferrous anode electrode is inhibited by including said electrode as a wall portion of an anode electrode chamber, of which another spaced wall portion constitutes a permselective membrane, and by sweeping the anode electrode chamber with a water solution containing a hydroxide of a cation selected from the group consisting of sodium, potassium, lithium, cesium, rubidium and ammonium.

4 Claims, 3 Drawing Figures

SYSTEM FOR INHIBITING ATTACK ON A FERROUS ANODE ELECTRODE IN AN ELECTRODIALYTIC CELL

BACKGROUND OF THE INVENTION

1. Field of the Invention

System for inhibiting electrochemical corrosion of a ferrous anode electrode in an electrodialytic cell.

2. Description of the Prior Art

Recognizing that the operation of an electrodialytic cell is such that the electrodes to which DC potential is applied at the opposite ends of the cell are subject to electrochemical corrosion, it is the practice to employ electrically conductive electrochemically inert materials for the electrodes. Typical such materials are platinized titanium, platinized tantalum and carbon plates, for example, graphite plates. These materials have certain drawbacks which render them objectionable for such use, except that it is important for the electrodes to have a long life which electrodes so composed did. Accordingly this one favorable factor overrides all disadvantages and results in the employment of such corrosion-resistant materials for this purpose. The disadvantages are that platinized and graphite plates are quite costly, the former more than the latter, and that graphite plates are not been able fully to withstand electrochemical corrosion, particularly at high current densities and when the anode electrode is in contact with electrolytic solutions having substantial amounts of sulfates therein. Furthermore, graphite is not a particularly mechanically strong material and, therefore, care has to be taken not to subject it to shock either before mounting in an electrodialytic cell or after it is incorporated in such a cell. It would be preferable to employ for cells of the foregoing nature inexpensive metal electrodes such, for example, as iron or its alloys which would have the virtue of being quite inexpensive and not requiring delicate handling. However, ferrous electrodes, and particularly ferrous anode electrodes, are not resistant to electrochemical corrosion when used in conventional electrodialysis systems so that they tend to be attacked quite rapidly and cause the electrolytic solution that is in contact with the electrodes to acquire impurities which is highly detrimental to the output of the cell and substantially reduce cell efficiency.

SUMMARY OF THE INVENTION

1. Purposes of the Invention

It is an object of the invention to provide for an electrodialytic cell a system which enables a ferrous anode electrode to be employed without electrochemical corrosion thereof.

It is another object of the invention to provide for an electrodialytic cell an electrode system in which a ferrous anode electrode forms at least part of a wall of an anode electrode chamber of which another and spaced wall is formed at least in part of a permselective membrane and in which said chamber is swept by an aqueous electrolyte containing a hydroxide of which the cation is selected from the group consisting of sodium, potassium, lithium, cesium, rubidium and ammonium.

It is another object of the invention to provide an electrodialytic cell having an electrode system in which a ferrous anode electrode forms at least part of a wall of an anode electrode chamber of which another and spaced wall is formed at least in part of a permselective membrane and in which the chamber is swept by an aqueous electrolyte containing a hydroxide of which the cation is selected from the group consisting of sodium, potassium, lithium, cesium, rubidium and ammonium.

Other objects of the invention in part will be obvious and in part will be pointed out hereinafter.

2. Brief Description of the Invention

An electrodialytic cell includes electrode chambers at opposite ends thereof. Each chamber has an electrode and, spaced from the electrode, a permselective membrane. A suitable DC polarity is applied to each electrode. The cell further includes at least one operating electrodialytic chamber intermediate the two electrode chambers, the operating chamber having spaced wall portions constituting permselective membranes. The particular electrodialytic action which occurs in any given intermediate operating electrodialytic chamber is not critical, that is to say, the intermediate operating chambers between the electrode chambers may constitute various kinds of operating electrodialytic chambers, although the operating chamber adjacent the cathode electrode chamber and sharing a common permselective membrane with said cathode electrode chamber should contain an electrolyte having a salt the cation of which is selected from the group consisting of sodium, potassium, lithium, cesium, rubidium and ammonium. In some instances different feed (electrolyte) solutions are supplied to different ones of the intermediate operating electrodialytic chambers. In other instances the intermediate chambers are supplied with the same feed solutions. Also, the feed solution for one intermediate chamber can constitute the output solution from another intermediate chamber. Pursuant to the invention, the anode electrode is ferrous and the anode electrode chamber is fed with an electrolyte which usually is different from the feed solutions for the intermediate operating chambers and which will not electrochemically attack the ferrous anode electrode. Said electrolyte is aqueous and contains a hydroxide of a cation selected from the group consisting of sodium, potassium, lithium, cesium, rubidium and ammonium. This hydroxide is supplied from a source external to the anode electrode chamber. The source preferably includes at least in part the outfeed solution from the cathode electrode chamber. The source also may include a source external to the cell, e.g. a rservoir of such an hydroxide, or it can be the outfeed from an intermediate operating chamber. The function of said hydroxide is to neutralize ions that might attack the material of the ferrous anode electrode and to passivate said electrode.

Both electrode chambers can be swept with a solution travelling in a circuit that moves the solution in parallel or in series through the two chambers, and this circuit can either be closed with recycling of the solution, or open with the solution discharged to waste.

The permselective membranes that in part define the cathode and anode electrode chambers may be anion or cation permselective membranes; the membranes selected will depend upon the operation desired for the intermediate chambers adjacent the electrode chambers.

The invention consists in the features of construction, combinations of elements, arrangements of parts and series of steps which will be exemplified in the systems and processes hereinafter described and of which the scope of application will be indicated in the appended claims.

BRIEF DESCRIPTION OF THE DRAWINGS

In the accompanying drawings in which are shown various possible embodiments of the invention.

PREFERRED EMBODIMENTS OF THE INVENTION

Figure 1:
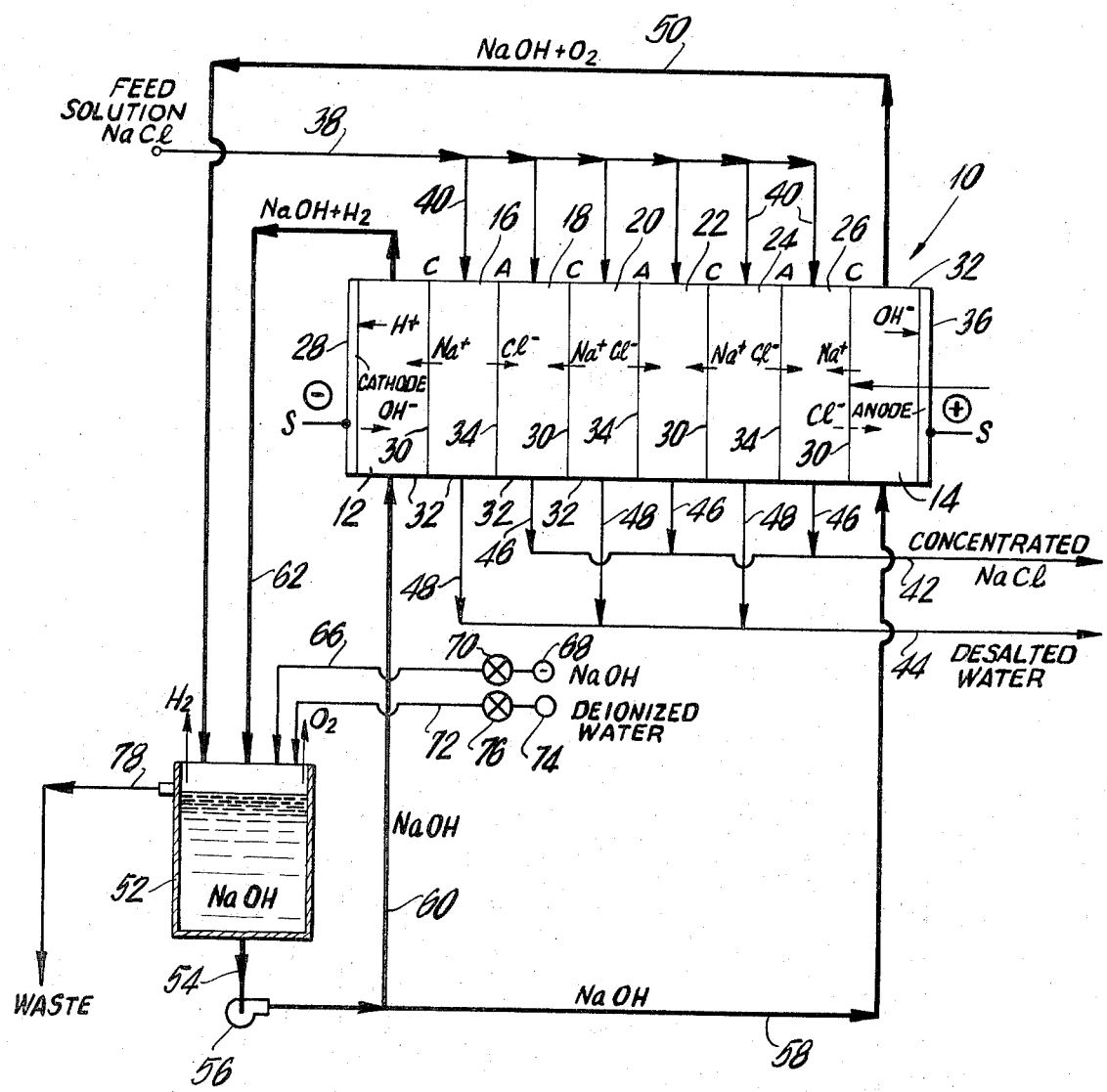
FIGS. 1 – 3 — are schematic views of different electrodialytic cells constructed in accordance with the present invention.

Referring now to the drawings, and more particularly to FIG. 1, the reference numeral 10 denotes an electrodialytic cell which incorporates the basic principle of the present invention. The cell is shown as being composed of a linear series of chambers including endmost electrode chambers and intermediate operating chambers, all of which will be detailed hereinafter, wherein the walls separating adjacent chambers constitute parallel plane faces. However, it should be understood that this showing is merely exemplificative of a linear cell and that it is within the ambit of the present invention to employ chambers which are concentrically arranged, one electrode chamber being cylindrical and at the central axis of a cell, the intermediate chambers being annular and concentric about the central electrode chamber and the other electrode chamber being outermost and concentric about the central electrode chamber but being located outside the outermost intermediate chamber. In this case, the membranes separating adjacent chambers likewise would be concentric about the central electrode chamber. For the purpose of brevity, only linear cells will be shown in this and subsequent figures and described herein. The physical structure for forming the chambers and for leading solutions to and from the same will not be detailed inasmuch as they are well known in the art.

In the figure under consideration, the reference numerals 12 and 14 denote the cathode and anode electrode chambers, respectively, and the numerals 16, 18, 20, 22, 24 and 26, respectively, denote the six intermediate chambers between the cathode chamber and the anode chamber. The chambers 16, 18, 20, 22, 24 and 26 constitute electrodialytic operating chambers, this adjective as applied to said intermediate chambers denoting that the function of said chambers is to perform electrodialytic operations upon solutions fed to such chambers.

As is known to persons skilled in this art, there is an interaction between adjacent operating chambers. However, as also is known in the art, the solutions fed to different operating chambers do not necessarily have to be identical. One of the common solutions fed to the operating chambers, and the one which will be mentioned hereinafter when typical operating conditions of the cell 10 are described, is a solution of sodium chloride. The salt solution also might be soft water, that is to say a solution containing only negligible amounts of undesirable cations such as calcium, magnesium, iron and manganese which, inter alia, have salts that might precipitate in the chamber or on the membranes. A soft water solution is obtained by passing a salt solution through a cation exchange resin bed operating on the $Na^+$ cycle. The solution fed to a typical intermediate operating chamber in the present invention in an exemplificative working example contains 1,000 ppm (parts per million) of sodium chloride in water.

The instant invention resides in the use of ferrous materials for the electrodes, particularly the anode, and in the constitution of the solutions fed to the electrode chambers, particularly the anode chamber, such solution being specially adapted to inhibit corrosion of the ferrous anode electrode.

The cathode chamber 12 constitutes a metal cathode plate electrode 28 which in the illustrated form of the invention is flat. The plate may be iron or steel or stainless steel, for instance, a nickel/chromium/iron 304 stainless steel. The metal cathode plate electrode 28 constitutes one flat face of the cathode chamber 12. The opposite flat face of said chamber is constituted by a cation permselective membrane 30. By way of example, a typical such membrane is an AMFion C-100 membrane manufacturd by AMFion Products/American Machine and Foundry Co. The membrane 30 is spaced from the cathode plate 28 and is parallel thereto. The electrode 28 and membrane are separated by a symbolically illustrated gasket 32 of an electrically non-conductive liquid impermeable material, e.g. a synthetic plastic, which is inert to the chemicals present in the cell. A foraminous web (not shown) of an electrically non-conductive inert material, e.g. polyvinyl chloride, may be used to fill the cathode electrode chamber 12.

Each chamber of the cell has its own gasket 32, the gaskets of all the chambers being denoted by the same reference numeral. All the chambers are suitably held together in end-to-end relationship to form the complete cell. The detailed physical structure of the cell and the arrangements for supplying solutions to and withdrawing solutions from the chambers is not illustrated since they form no part of the instant invention and are well known in the art.

The face of the intermediate operating chamber 16 adjacent the cathode electrode chamber 12 is defined by the cation permselective membrane 30 which is common to both said chambers. The opposite face of the chamber 16 is defined by an anion permselective membrane 34 which is spaced from and parallel to the membrane 30. The two chambers 12 and 16 are in alignment. The cross-sectional dimensions thereof in a plane perpendicular to the axis of the cell which extends centrally of the cell between the two electrode chambers are identical. The thicknesses of the chambers will depend, as is well known, upon the hydraulic and electrical resistances desired to be maintained.

The intermediate operating chambers 18, 20, 22, 24 and 26 are essentially similar to the chamber 16, the defining permselective membranes of such chambers having alternate characteristics; that is to say, the membrane between the chambers 18 and 20 is a cation permselective membrane, the membrane between the chambers 20 and 22 is an anion permselective membrane, the membrane between the chambers 22 and 24 is a cation permselective membrane, and the membrane between the chambers 24 and 26 is an anion permselective membrane.

A typical satisfactory anion permselective membrane is an AMFion A-100 membrane manufactured by AMFion Products/American Machine and Foundry Co.

It will be understood that the permselective membranes mentioned are merely given by way of illustration. There are available on the market many other usable types of permselective membranes, examples of which are: manufactured by Ionics, Inc., for an anionic permselective membrane, 111BZL183, 111BZL066, 111BZL065 and 111EZL219, and for a cationic permselective membrane, 61AZL183, 61AZL066, 61AZL065, 61CZL183, 61AZG067 and 61AZS068; manufactured by Ionac Chemical of Sybron Corporation, for a cationic permselective membrane, MC3142 and MC3470, and for an anionic permselective membrane, MA3148 and MA3475; manufactured by Asahi Chemical Industry Co., Ltd., for an anionic permselective membrane, CA-1, CA-2, DA-1 and DA-2, and for a cationic permselective membrane, CK-1 and DK-1.

The anode electrode chamber 14 has a construction similar to that of the cathode electrode chamber. It constitutes a ferrous anode plate electrode 36 having spaced therefrom and parallel thereto a cation permselective membrane which also forms and adjacent face of the intermediate operating chamber 26. A source S of DC potential is connnected by negative and positive leads, respectively, to the plates 28, 36. The anode electrode chamber has its side walls defined by a gasket 32 such as described previously and is filled by a foraminous web.

The constitution of the liquid solution which sweeps the anode chamber and the hydraulic circuit therefor will be detailed hereinafter in connection with the aspects of the cell 10 which are unique to the present invention. At this point it suffices to understand that the sweeping solution must be electrically conductive and, since this characteristic is imparted to the solution by forming the same with a water carrier in which an ionizable compound is dissolved, such solution is inherently electrolytic.

The particular characteristics of the intermediate operating chambers is determined by the types of action to be performed thereby. Any standard actions that can be performed by electrodialysis may be utilized. In the cell 10 under consideration alternate intermediate operating chambers are selected to perform deslination and concentration, respectively. Specifically, the chambers 16, 20 and 24 perform desalination and the chambers 18, 22 and 26 perform concentration. The sundry permselective membranes have been so chosen that these functions will be carried out. Moreover, the liquid circuits of the intermediate operating chambers have been chosen for the same purpose.

Specifically, a sodium chloride feed solution is pumped into an infeed manifold 38 from which it is directed by branches 40 to the intermediate operating chambers 16, 18, 20, 22, 24 and 26. Two outfeed manifolds are provided, the first an outfeed manifold 42 for a concentrated sodium chloride solution, and the second an outfeed manifold 44 for desalted water. The manifold 42 is connected by branches 46 to the outlets of the intermediate operating chambers 18, 22 and 26. The manifold 44 is connected by branches 48 to the outlets of the intermediate operating chambers 16, 20 and 24.

The intermediate operating chambers 16, 18, 20, 22, 24 and 26 function in a conventional manner upon the passage of DC electric current therethrough between the two electrode chambers 12 and 14. As is well known, and as indicated in FIG. 1, electrodialytic action will cause sodium and chlorine ions to migrate respectively toward (but not to) the cathode chamber and the anode chamber through the permselective membranes 30 and 34. Since sodium and chlorine ions leave chambers 16, 20 and 24 the water flowing out of these chambers will be desalted. Conversely, since sodium and chlorine ions enter chambers 18, 22 and 26 the solutions flowing out of these chambers will be concentrated solutions of sodium chloride. It also will be observed that because an electrodialytic action is taking place between the operating chamber 16 and the cathode chamber 12, sodium ions are introduced into the cathode chamber. It should be mentioned that, as is known in the art, permselective membranes are not completely selective. Accordingly, there will be some passage of chlorine ions from the concentration chamber 26 into the anode electrode chamber 14.

If a sodium chloride solution were to sweep the anode chamber, such solution would attack the ferrous anode electrode, particularly in view of the electrolytic action that is taking place, and this would quickly corrode such electrode and contaminate the solution. It is the purpose of the present invention to provide an arrangement which prevents this corrosion from taking place. As indicated earlier, such a beneficial result is obtained by sweeping the anode electrode chamber with an electrolyte containing a hydroxide of a cation selected from the group consisting of sodium, potassium, lithium, cesium, rubidium and ammonium. In the particular examples being described, the cation present in the electrolyte in the anode electrode chamber 32 is sodium. Preferably the same electrolyte is employed to sweep the cathode electrode chamber. To obtain good operational characteristics, the solutions fed to the intermediate operating chamber 16 next to the cathode electrode chamber 12 has in solution as the principal constituent a salt of which the cation is the same as that contained in the electrode chamber sweeping solution whereby the cation will migrate to the cathode electrode chamber through the cation permselective membrane defining a wall of the latter chamber.

The hydraulic circuit used to supply the sweeping solution includes a conduit 50 which leads from the anode electrode chamber 32 to a tank 52 containing sodium hydroxide which is more concentrated than the concentration of the feed solution for the intermediate operating chambers. The more concentrated the feed solution, the higher the current density and thereby the higher the concentration of the NaOH solution in the tank 52. A conduit 54 leads from the bottom of the tank 52 to a pump 56 which discharges the sweeping solution under a mild pressure to a conduit 58 that leads to the anode electrode chamber 32.

For convenience in following the flow paths of the sweeping solution as distinguished from the flow paths for the intermediate operating chambers, all flow paths for the sweeping solution are indicated by heavy lines with appropriate directional arrowheads, and all flow paths for the solutions traversing the operating chambers are indicated by light lines with appropriate arrowheads. Likewise, for ease of understanding the operation of the cell 10, arrows at various locations with appropriate identification indicate the direction of travel of different ions. A dotted arrow and designation indicate the leakage path of travel of a chloride ion into the anode electrode chamber 36.

A branch conduit 60 leads from the conduit 58 to an inlet to the cathode electrode chamber 12. A conduit 62 leading from an outlet from the cathode electrode chamber discharges into the sodium hydroxide tank 52.

Hence, as the pump operates, an aqueous solution of concentrated sodium hydroxide will sweep in parallel through the anode and cathode electrode chambers to be discharged into the sodium hydroxide tank and recirculated back to the electrode chambers.

In the cathode chamber 12 water is disassociated by the passage of current between the electrodes to evolve hydrogen ions that combine to form hydrogengas which is released in the tank 52. Hydroxide ions also are generated by electrolysis; these combine with sodium ions migrating from the adjacent intermediate operating chamber 16 through the cation permselective member 30 to form sodium hydroxide. The thus-formed sodium hydroxide adds to the supply of sodium hydroxide which is swept through the electrode chambers 12 and 14 from the conduits 58 and 60 to the conduits 50 and 62 by the pump 56.

It will be observed that the solution sweeping through the anode electrode chamber does not contain any appreciable amount of anions other than hydroxide anions. For example, it does not contain sulfate ions or chloride ions which would tend to electrochemically attack the steel metal anode plate 36. In this manner, said anode plate is preserved against electrochemical attack. Also the steel metal cathode plate in the cathode electrode chamber is swept by the same sodium hydroxide solution which will not attack ferrous materials. The foregoing arrangement is in contrast to cells in which the electrolyte in contact with the anode electrode principally contained a chloride salt that would by electrolysis generate chlorinegas and a small amount of hydrochloric acid and that would erode a ferrous anode electrode.

Some chloride anions will penetrate the cation permselective membrane forming a wall of the anode electrode chamber 14. However, these are neutralized by the sodium hydroxide present in the sweeping solution, so that these anions are essentially prevented from attacking the ferrous anode plate. Such neutralization reduces the amount of sodium hydroxide in the sweeping solution and it is for this reason that the sweeping solution includes in its cycling path the sodium-hydroxide-containing tank. It already has been observed that sodium hydroxide is supplied to the sweeping solution cycle by the formation of sodium hydroxide in the cathode electrode chamber 12. However, this may be insufficient and, to insure that there is a high enough concentration of sodium hydroxide in the electrode chamber sweeping solution, an additional source of sodium hydroxide is included, this constituting a conduit 66 into which a concentrated solution sodium hydroxide is introduced at the inlet 68 thereof. The concentration of sodium hydroxide in the sweeping solution can vary widely. An approximate relationship that has been found to yield good results in the operation of the present invention is NaOH concentration of sweeping solution, ppm = K × current density in amperes per square feet of electrode surface, where K is about 600. Enough sodium hydroxide is present in the sweeping solution to neutralize any anions which may leak through the permselective membranes forming walls of the electrode chambers and the ions of any molecules that may diffuse through these membranes. The amount of sodium hydroxide introduced into the sweeping path from all sources should be approximately enough to neutralize anions which stray into the anode electrode chamber or into said path at any other points and to offset the loss of sodium hydroxide in the anode chamber caused by electrolysis thereof in the sweeping solution. If the amount of such anions is small, the make-up sodium hydroxide introduced at the inlet 68 can be fed at a very slow rate inasmuch as sodium hydroxide is constantly being generated in the cathode electrode chamber. The selection of a proper rate of flow of the make-up sodium hydroxide solution, therefore, will be regulated to keep the sodium hhydroxide present in the sweeping solution at the desirably high concentration. If desired, the concentration of sodium hydroxide in the sweeping solution can be controlled automatically as by monitoring the density of the sweeping solution or its resistivity or capacity or any other characteristic which can be readily translated into regulation of a valve 70 in the conduit 66.

The make-up sodium hydroxide can be introduced in the form of a solution or as a solid and, in such event, the concentration thereof is regulated by introducing deionized water through a conduit 72 which leads to the tank 52 as does the conduit 66. Deionized water is supplied to the conduit 72 at an inlet 74. The conduit 72 includes a regulation valve 76. Inasmuch as concentrated make-up sodium hydroxide solution, or its equivalent of solid sodium hydroxide and deionized water, introduced into the sodium hydroxide tank 52 would increase the volume of sweeping solution beyond the capacity of the sweeping path, means is included to permit escape of excess sodium hydroxide solution to waste. Said means constitutes an overflow conduit 78 having an inlet at a high point in the tank and an outlet which leads to a waste or storage.

It will be appreciated that, pursuant to the invention, no electrodialytic work is performed in either one of the electrode chambers in the sense that the solution which sweeps these chambers is maintained at a substantially constant level of concentration of the prime compound which is a hydroxide of a cation selected from the group consisting of sodium, potassium, lithium, cesium, rubidium and ammonium. The invention is not restricted to sodium hydroxide, which compound only has been mentioned because a principal use of such a cell is for electrodialytic treatment of sodium chloride, so that it is convenient to use sodium hydroxide in the sweeping solution. It will, of course, be appreciated that if the feed solution which passes through the operating chamber alongside the cathode chamber contains a salt with a different cation of the above group, it is preferred to use a hydroxide of that cation in the sweeping solution.

The operating chambers 16, 18, 20, 22, 24 and 26 may perform any desired type of electrodialytic action. As indicated above, in the example here being described, the chambers 16, 20 and 24 perform a desalting function so that their output is a dilute sodium chloride water solution, whereas the remaining operating chambers perform a concentrating function so that their output is a solution of concentrated sodium chloride.

By way of example operation of the cell 10 will be described with specific figures assigned to certain members. In this example only two operating chambers 16 and 18 (the two chambers being a pair including one desalination and one concentration chamber) were interposed between the cathode and anode electrode chambers 12 and 14, the chambers 20, 22, 24 and 26 being eliminated. The infeed solution in manifold 38 was a sodium chloride solution containing 1,000 ppm sodium chloride. The purpose of such a four-chamber cell was to (a) desalt water containing dissolved sodium chloride and (b) to supply salted water. In this cell the cathode electrode 28 and the anode electrode 36 were 1/16 inch thick plates of stainless (304) steel each 21-½ inches long and 4-½ inches wide with an effective area (area exposed to current flow and not covered by a gasket 32) of 0.4 square feet. The cation permselective membranes 30 were AMFion C-100 and the anion permselective membranes 34 were AMFion A-100. All membranes had an effective area of 0.4 square feet.

A series of desalting runs were performed in said cell under various conditions. For each run the flow rate of the infeed solution to the intermediate desalting chamber 16 was set and maintained constant at a value of about 250 ml/min or 4 GPH for 8 hours. The initial caustic soda concentration at the concentrated sodium hydroxide tank 52 was 10,000 ppm NaOH (about 10 grs/liter) and the pH was 30.20.

The data obtained in each run, including the current density, the total current through the cell, the flow rate of the infeed solution, the total voltage across the cell, the end electrode potential (Eo), the voltage across the chamber pair 16 and 18, the pH of the concentrated sodium hydroxide electrode chamber sweeping solution and the calculated values of the power consumed (in KWH/1,000 gallons of infeed solution treated) are set forth in Table I.

Table I

| Run number | I | II | III | IV |
|---|---|---|---|---|
| Influent concentration (ppm NaCl) | 1,000 | 1,000 | 1,000 | 1,000 |
| Current (amps.) | 1.0 | 2.0 | 3.0 | 4.0 |
| Current density (amps./sq. ft.) | 2.5 | 5.0 | 7.5 | 10.0 |
| Flow rate (GPH) | 4.0 | 4.0 | 4.0 | 4.0 |
| Total voltage (volts) | 2.0 | 3.5 | 5.4 | 8.5 |
| End electrode voltage Eo (volts) | 0.6 | 0.6 | 0.6 | 0.6 |
| Voltage/chamber pair (volts) | 1.4 | 2.9 | 4.8 | 7.9 |
| Pressure drop (p.s.i.) | 4 | 4 | 4 | 4 |
| pH of electrode chamber sweeping solution | 13.15 | 13.10 | 13.05 | 13.07 |
| Power consumed (KWH/1000 G) | 0.35 | 1.45 | 3.60 | 7.90 |

Samples of the effluent were analyzed for sodium chloride concentration from the desalting chamber 16 in each run with the following results:

Table II

| Run | I | II | III | IV |
|---|---|---|---|---|
| Effluent concentration (ppm NaCl) | 870 | 750 | 660 | 570 |
| % desalting per pass | 12.8 | 24.4 | 34.5 | 43.2 |

From Table I it will be seen that the pH of the caustic soda in the electrode chamber sweeping electrolyte remained almost constant throughout the four runs indicating that the process was regenerative, i.e., supplied from the cathode electrode chamber as much sodium hydroxide as was consumed in the anode electrode chamber. No make-up sodium hyroxide was necessary or supplied.

Figure 2:
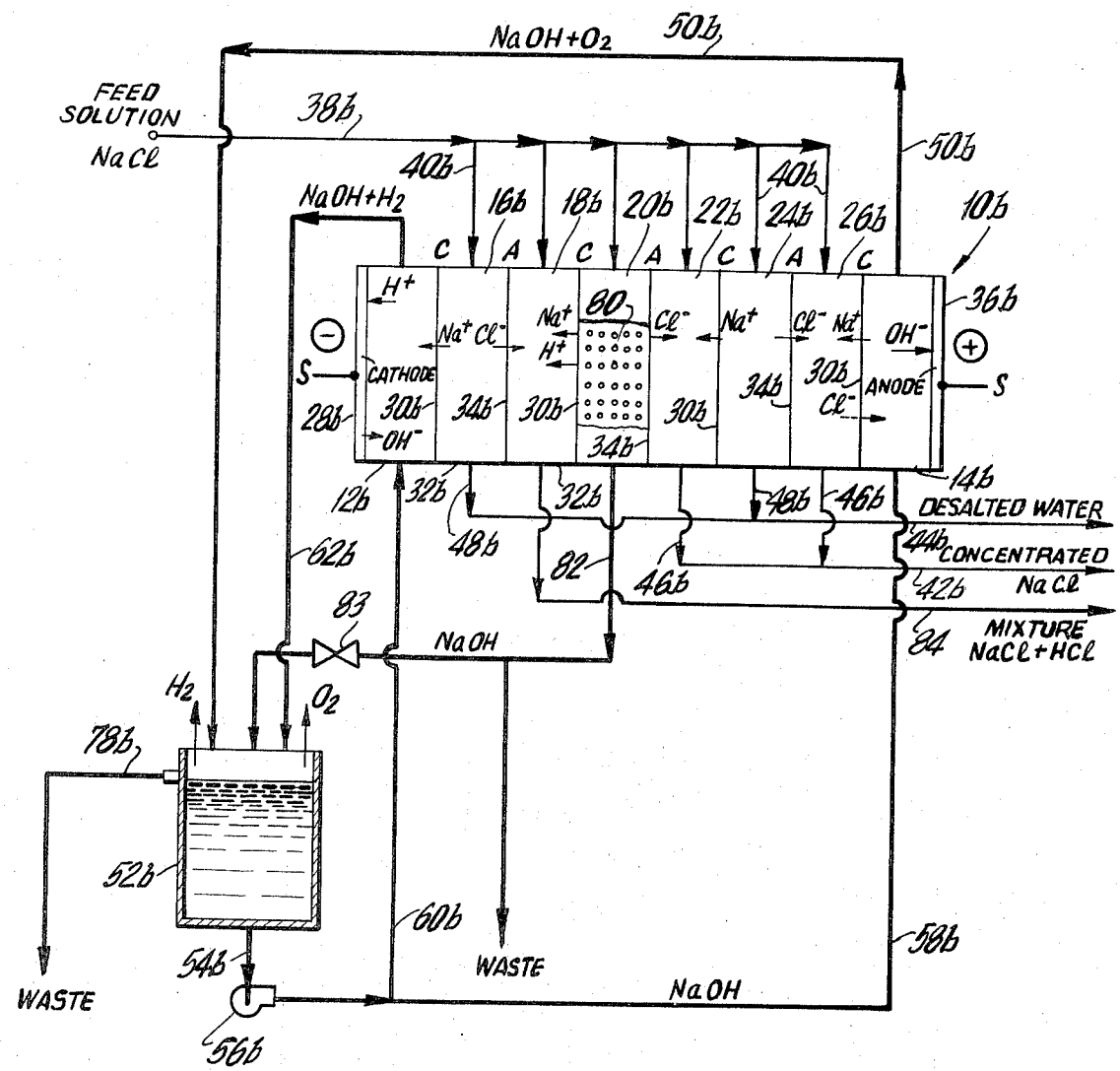
Figure 3:
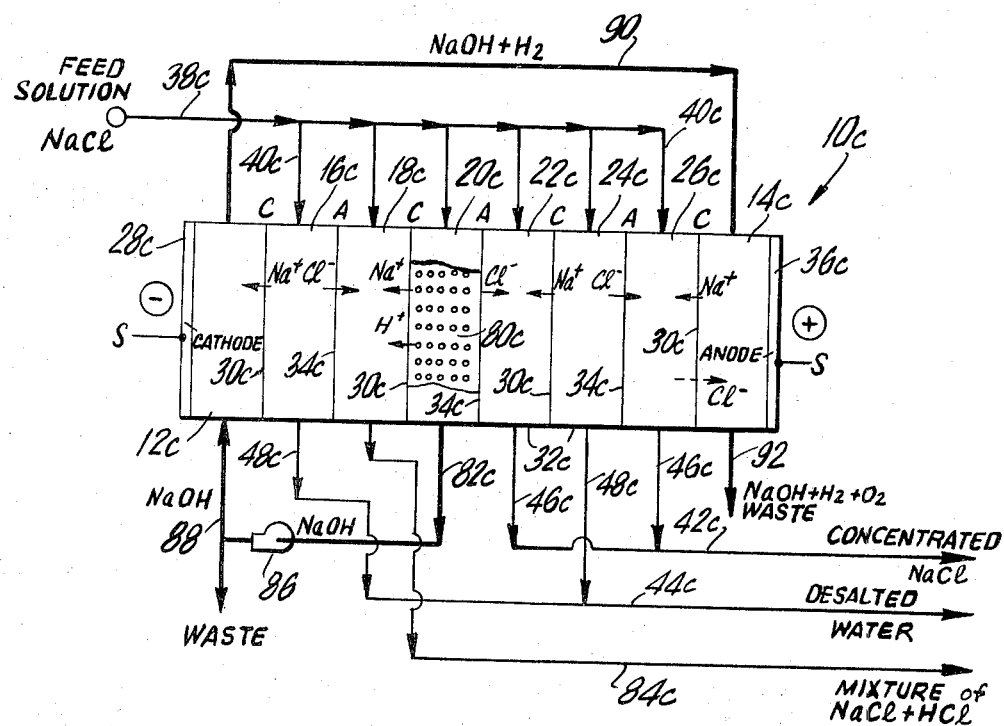

Various modifications and refinements of the cell 10, which is a basic embodiment of the present invention, can be employed and are shown in subsequent FIGS. 2 and 3. Essentially, these variations and modifications constitute different arrangements of flow paths for the electrode chamber sweeping solution, and different arrangements for injecting sodium hydroxide into the sweeping solution cycle from a source within the cell itself rather than from a source external to the cell as in the case of the first embodiment of the invention.

Inasmuch as there is considerable repetition of structure in the FIGS. 2 and 3 forms of the invention, in order to minimize the lengths of the description of these forms, in all instances where there is a commonality of elements with the FIG. 1 form, identical reference numerals will be applied to the elements which will not described except as need be in passing; however, differentiating indicia in the form of lower-case letters of the alphabet will be used. The first letter of the alphabet, i.e., "a," has been omitted from the FIG. 1 reference numerals so that the identifying symbols will correspond in alphabetical order to the number of the example. Thus, "10b" will denote the cell of FIG. 2 and "10c" the cell of FIG. 3.

In FIG. 2 there is shown a cell 10b which is essentially similar to the cell 10, except for the following basic difference and other differences which will become apparent as the description proceeds: the cell 10b does not feed externally supplied deionized water or make-up sodium hydroxide into the tank 52b.

The cell 10b includes electrode chambers 12b and 14b as well as intermediate operating chambers 16b, 18b, 20b, 22b, 24b and 26b. Ferrous electrodes 28b and 36b aree identical to those of the cell 10. The intermediate operating chambers 16b, 18b, 22b, 24b and 26b are identical in construction and function to the correspondingly numbered chambers of the cell 10. However, the intermediate operating chamber 20b functions as a caustic producing chamber and, for this purpose, is substantially filled with an anion exchange resin 80, e.g. AMBERLITE IRA-400 manufactured by Rohm and Haas Co. operating on the OH⁻ cycle. Other typical anion resins that could be used in its place are AMBERLITE IRA 400-C, 401-S, 402, 410, 425, 458, 900, 900-C, 904, 910, 911 and 938. The purpose of packing this chamber with such a resin will become apparent shortly.

A sodium chloride feed solution is introduced into inlet manifold 38b from where it is led into the several intermediate chambers through branches 40b. It will be observed that one of these conduits leads sodium chloride solution to the chamber 20b. In the process of electrodialysis in conjunction with the anion resin, a small amount of sodium ions passes through the cationic permselective membrane 30b defining one side wall of the chamber, and a large amount of chlorine ions passes through the anionic permselective membrane 34b forming the opposed parallel spaced wall of the chamber 20b. Moreover, a large amount of hydrogen ions passes through the aforesaid cationic permselective membrane. Hence, the solution leaving the intermediate chamber 20b which is filled with the anion exchange material will be dilute sodium hydroxide almost free of sodium chloride, the solution leaving said chamber 20b through a conduit 82. Part of such solution is sent to waste in order to keep a high NaOH concentration in tank 52b or the caustic solution may be used for an industrial purpose. The amount of said solution so described is controlled by a valve 83. Said conduit 82 leads to and terminates above the tank 52b and essentially replaces the conduit 66 of FIG. 1 which supplied make-up sodium hydroxide. Thereby the external source of make-up sodium hydroxide is replaced by an integral part of the cell 10b, to wit, the chamber 20b filled with an anion exchange resin. The cell 10b also has an outfeed manifold 44b for a dilute sodium chloride solution discharge as well as lateral branches 48b running to the operating chambers 16b and 24b. The cell 10b also has an outfeed manifold 42b for a concentrated sodium chloride solution, the same being connected by lateral branches 46b to the operating intermediate chambers 22b and 26b. There is no connection of this outfeed manifold to the chamber 18b inasmuch as said outfeed contains a mixture of sodium chloride and hydrochloric acid in water which is connected to an outflow conduit 84. The presences of hydrochloric acid is due to the passage of hydrogen ions through the cation exchange permselective membrane 30b at one face of the chamber 18b (along with some sodium ions) and the passage of chloride ions through the anion exchange membrane 34b at the opposite face of the chamber 18b.

The remaining elements of the cell 10b are identical to those shown and described with respect to FIG. 1 and include the following: conduits 50b, 54b, 60b, 62b and 78b, and a pump 56b.

In the operation of the cell 10b the sodium hydroxide solution sweeping the two electrode chamber 12b and 14b prevents, as it did in the case of the cell 10, corrosion of the ferrous anode plate 36b, and also serves as a conductor of electric current from the electrode plates to the intermediate chambers for concentration and dilution of the infeed solution as well as generation of a make-up solution of sodium hydroxide solution is deionized water from the chamber 20b.

In this cell 10b sodium hydroxide is produced at the cathode chamber 12b, as it was at the cathode chamber 12 in the FIG. 1 form of the invention, and such sodium hydroxide produced in the cathode chamber plus the sodium hydroxide produced in the intermediate chamber 20b is approximately two equivalents of sodium hydroxide per farad of current passed, although most of the sodium hydroxide generated by the chamber 20b is led to waste. At the anode chamber 14b approximately one equivalent of sodium hydroxide is lost by electrodialysis for each equivalent of sodium hydroxide gained at the anode chamber 14b. Thus, the cell 10b produces its own sodium hydroxide and additional make-up sodium hydroxide, as needed, is introduced into the path of the electrode chamber sweeping solution from the chamber 20b.

In FIG. 3 another form of the invention is disclosed which constitutes a cell 10c that is essentially similar to the cell 10b, except that the electrode chambers are connected in series instead of in parallel and there is no sodium hydroxide tank. All infeed and outfeed connections to the operating chambers and supply chamber are identical to those of the cell 10b of FIG. 2 and, hence, these chambers and the conduits have been given corresponding numbers. Instead of running the conduit 82c from the chamber 20c to a sodium hydroxide tank, as in the case of FIG. 2, the conduit 82c is connected to a pump 86, if desired, the outlet of which feeds to a conduit 88 that leads to the cathode electrode chamber and to waste, the ratio of the flow of sodium hydroxide solution from chamber 20c to the cathode electrode chamber and to waste being controlled by a valve 89. Thereby the desired concentration of sodium hydroxide is maintained in a conduit 90 leading from the cathode electrode chamber to the anode electrode chamber. A conduit 92 leads from the anode electrode chamber to waste. Hence, in this form of the invention the make-up sodium hydroxide to compensate for sodium hydroxide lost by electrodialysis in the anode electrode chamber and by neutralization of stray anions in the path of the electrode chamber sweeping solution is, as in the FIG. 2 form of the invention, furnished both by the sodium hydroxide supply chamber 20c and by formation of sodium hydroxide at the cathode electrode chamber. The sweeping solution after passing in series through the cathode electrode chamber and the anode electrode chamber exits to waste. At the anode electrode chamber an equivalent of sodium hydroxide is lost by electrodialysis for each equivalent of sodium hydroxide gained by electrodialysis and electrolysis at the cathode electrode chamber, but the sodium hydroxide furnished by the supply chamber 20c suffices to neutralize any stray anions such as chlorine anions, so that no corrosion of the electrode plates 28c, 36c and, in particular of the plate 36c, takes place.

Like th cells 10 and 10b of FIGS. 1 and 2, the cell 10c of FIG. 3 will function indefinitely without harm to the metal of the anode electrode plate andd without contaminating the sweeping solution. Although this arrangement sends to waste almost one equivalent of sodium hydroxide, the wastage in inconsequential and, indeed, is in the same order of wastage as is experienced in the overflows of the cell 10 and 10b of the first two described forms of the invention.

The term "ferrous" as used herein includes, iron, iron alloys, steel, stainless steel, chromium and nickel. use.

It thus will be seen that there have been provided cells and processes which achieve the various objects of the invention and which are well adapted to meet the conditions of practical ue.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by letters patent:

1. An electrodialytic apparatus for the treatment of electrolytic fluids, said apparatus comprising several serially disposed compartments including a first end compartment having a ferrous cathode electrode disposed therein, a second end compartment spaced from said first end compartment, said second end compartment having a ferrous anode electrode disposed therein, plural intermediate compartments between said first end compartment and said second end compartment, ion permselective membranes separating each compartment from the compartments immediately adjacent thereto, means for introducing into and removing electrolytic fluid from all the intermediate compartments, means for impressing a direct electric current across said cathode and said anode electrodes, and means for continuously introducing into and removing an aqueous caustic solution from said end compartments.

2. An apparatus as set forth in claim 1 wherein a source of aqueous caustic solution is provided external to the compartments and wherein the means continuously introducing into and removing the aqueous caustic solution from the end compartments draws the aqueous caustic solution from said source.

3. An apparatus as set forth in claim 1 wherein the electrolytic fluid removed from one of the intermediate compartments is an aqueous caustic solution and wherein the means introducing electrolytic fluid into the end compartments draws the aqueous caustic solution from the aforesaid end compartment.

4. An apparatus as set forth in claim 3 wherein a bed of an ion exchange material is disposed in the intermediate compartment from which the aqueous caustic solution is drawn.

* * * * *